United States Patent [19]

Sorensen

[11] Patent Number: 5,045,268
[45] Date of Patent: Sep. 3, 1991

[54] CROSS-LAMINATION INJECTION MOLDING

[76] Inventor: Jens O. Sorensen, P.O. Box 2274, Rancho Santa Fe, Calif. 92067

[21] Appl. No.: 448,763

[22] Filed: Dec. 11, 1989

[51] Int. Cl.⁵ ............................................ B29C 45/16
[52] U.S. Cl. .................... 264/246; 264/255; 264/328.7; 264/328.8; 264/328.12; 425/127; 425/129.1; 425/130
[58] Field of Search ............... 264/245, 246, 255, 265, 264/294, 328.1, 328.7, 328.8, 328.11, 328.12; 425/126.1, 127, 129.1, 130, 134

[56] References Cited

U.S. PATENT DOCUMENTS

| 2,799,435 | 7/1957 | Abplanalp | 264/328.8 |
| 3,178,497 | 4/1965 | Moscicki | 425/129.1 |
| 3,822,107 | 7/1974 | Wagerer | 425/130 |
| 3,878,282 | 4/1975 | Bonis et al. | |
| 3,914,081 | 10/1975 | Aoki | 425/130 |
| 3,944,124 | 3/1976 | Hexel | 229/1.5 B |
| 3,947,176 | 3/1976 | Rainville | 425/130 |
| 4,295,811 | 10/1981 | Sauer | 425/112 |
| 4,302,416 | 11/1981 | Rudolf et al. | 425/129.2 |
| 4,307,137 | 12/1981 | Ota et al. | 428/35 |
| 4,726,758 | 2/1988 | Sekine et al. | 425/575 |
| 4,743,420 | 5/1988 | Dutt | 425/577 |

FOREIGN PATENT DOCUMENTS

022481 2/1979 Japan .

Primary Examiner—Jill L. Heitbrink
Attorney, Agent, or Firm—Edward W. Callan

[57] ABSTRACT

A plastic product having a cross-laminated section including a first plastic layer and a second plastic layer is injection molded in a mold system that includes a first mold cavity with a first-layer-defining-mold-cavity-section and a second mold cavity with a second-layer-defining-mold-cavity-section that has a second-cavity-section-wall. The product is molded by injecting a quantity of first plastic into the first mold cavity so that first plastic flows from a flow channel into the first-layer-defining-mold-cavity-section in a first predetermined general direction that is different than the direction of the flow channel; solidifying at least partly the flowed first plastic in the first-layer-defining-mold-cavity-section to thereby form said first plastic layer having a first-direction-flow-record; adjusting the mold system to provide the second mold cavity, with the second-cavity-section-wall including the first plastic layer; injecting a quantity of second plastic into the second mold cavity so that second plastic flows from a flow channel into the second-layer-defining-mold-cavity-section in a second predetermined general direction that is different than the direction of the flow channel, whereby second plastic in the second-layer-defining-mold-cavity-section fuses with the first plastic layer; and solidifying the flowed second plastic in the second-layer-defining-mold-cavity-section to thereby form the second plastic layer, so that the second plastic layer has a second-direction-flow-record, which is positively different from the first-direction-flow-record, to thereby form the plastic product with the cross-laminated section that includes both the first plastic layer and the second plastic layer. The first plastic and the second plastic are injected through at least one shared gate.

38 Claims, 3 Drawing Sheets

FIG. 9

CROSS-LAMINATION INJECTION MOLDING

BACKGROUND OF THE INVENTION

The present invention generally pertains to injection molding of plastic products and is particularly directed to a method and a system for producing cross laminated products with greatly improved flexure and impact strength.

SUMMARY OF THE INVENTION

The present invention provides a method of injection molding a plastic product, that has a cross-laminated section including a first plastic layer and a second plastic layer, in a mold system comprising a first mold cavity with a first-layer-defining mold-cavity-section and a second mold cavity with a second-layer-defining-mold-cavity-section that has a second-cavity-section-wall, the method comprising the steps of:

(a) injecting a quantity of first plastic into the first mold cavity so that first plastic flows in the first-layer-defining-mold-cavity-section in a first predetermined general direction;

(b) solidifying at least partly the flowed first plastic in the first-layer-defining-mold-cavity-section to thereby form said first plastic layer having a first-direction-flow-record;

(c) adjusting the mold system to thereby provide the second mold cavity with the second-cavity-section-wall including said first plastic layer;

(d) injecting a quantity of second plastic into the second mold cavity so that second plastic flows in the second-layer-defining-mold-cavity-section in a second predetermined general direction, whereby second plastic in the second-layer-defining-mold-cavity-section fuses with said first plastic layer;

(e) solidifying the flowed second plastic in the second-layer-defining-mold-cavity-section to thereby form said second plastic layer, so that the second plastic layer has a second-direction-flow-record which is positively different from said first-direction-flow-record, to thereby form said plastic product with said cross-laminated section that includes both the first plastic layer and the second plastic layer and (f) adjusting the mold system to thereby eject the product, and prepare for the next production cycle.

For high efficiency production, it is an advantage to operate two sets of mold systems concurrently in the same injection molding machine, but displaced in time so that the first injection, first solidifying and first adjusting step of one mold system set takes place generally simultaneously with the second injection, second solidifying and second adjusting step of the other system set.

The above mentioned method may be generalized for the production of products with three or more layers, therefore the present invention also provides a method of injection molding a plastic product, with a cross-laminated section that includes a primary layer, a secondary plastic layer and a tertiary plastic layer, in a mold system comprising a primary-layer-defining-mold-cavity-section a secondary mold cavity with a secondary-layer-defining-mold-cavity-section with a secondary-cavity-section-wall, and a tertiary mold cavity with a tertiary-layer-defining-mold-cavity-section with a tertiary-cavity-section-wall, the method comprising the steps of:

(a) injecting a quantity of primary plastic into the primary mold cavity so that the primary plastic flows in the primary-layer-defining-mold-cavity-section in a primary predetermined general direction;

(b) solidifying at least partly the flowed primary plastic in the primary-layer-defining-mold-cavity-section to thereby form said primary plastic layer having a primary-direction-flow-record;

(c) adjusting the mold system to thereby provide the secondary mold cavity with the secondary-cavity-section-wall including said secondary plastic layer;

(d) injecting a quantity of secondary plastic into the secondary mold cavity so that secondary plastic flows in the secondary-layer-defining-mold-cavity-section in a secondary predetermined general direction, and fusing the secondary plastic in the secondary-layer-defining-mold-cavity-section with said primary plastic layer;

(e) solidifying at least partly the flowed secondary plastic in the secondary-layer-defining-mold-cavity-section to thereby form said secondary plastic layer having a secondary-direction-flow-record, and so that the secondary plastic layer has a secondary-direction-flow-record which is positively different from said primary-direction-flow-record;

(f) adjusting the mold system to thereby provide the tertiary mold cavity with the tertiary-cavity-section-wall including said secondary plastic layer;

(g) injecting a quantity of tertiary plastic into the tertiary mold cavity so that tertiary plastic flows in the tertiary-layer-defining-mold-cavity-section in a tertiary predetermined general direction, whereby tertiary plastic in the tertiary-layer-defining-mold-cavity-section fuses with said secondary plastic layer;

(h) solidifying the flowed tertiary plastic in the tertiary-layer-defining-mold-cavity-section to thereby form said tertiary plastic layer, so that the tertiary plastic layer has a tertiary-direction-flow-record which is positively different from said secondary-direction-flow-record, to thereby form said plastic product with said cross-laminated section that includes all of the primary plastic layer, the secondary plastic layer and the tertiary plastic layer and (i) adjusting the mold system to thereby eject the product, and prepare for the next production cycle.

For high efficiency production, it is an advantage to operate three sets of mold systems concurrently in the same injection molding machine, but displaced in time so that the first injection, first solidifying and first adjusting step of one mold system set takes place generally simultaneously with the second injection, second solidifying and second adjusting step of an other mold system set, which takes place generally simultaneously with the third injection, third solidifying and third adjusting step of the remaining mold system set.

The present invention also provides a molding system for practicing the invented process, and a product made in accordance with the invented process as mentioned above.

Additional features of the present invention are described in relation to the description of the preferred embodiments.

DESCRIPTION OF THE PREFERRED EMBODIMENTS

Figure 1:
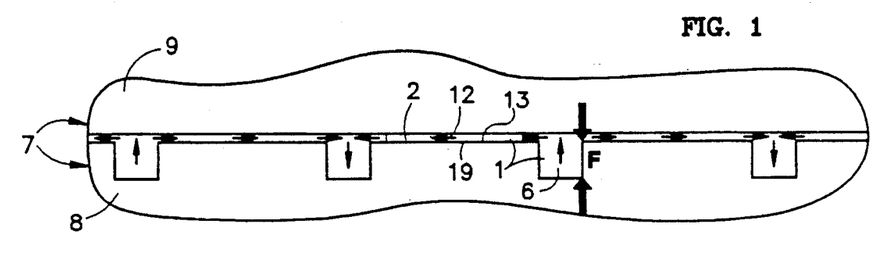
FIG. 1 is a partial sectional view of a first mold cavity encasing a first plastic layer of a first preferred embodiment in accordance with the invention.
Figure 2:
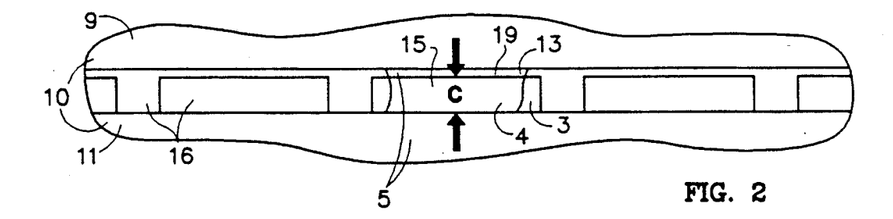
FIG. 2 is a partial sectional view of a second mold cavity encasing a second plastic layer of the first preferred embodiment in accordance with the invention. Also shown is a sectional view of a cross-laminated product section taken along line 2—2 in FIG. 3.
Figure 3:
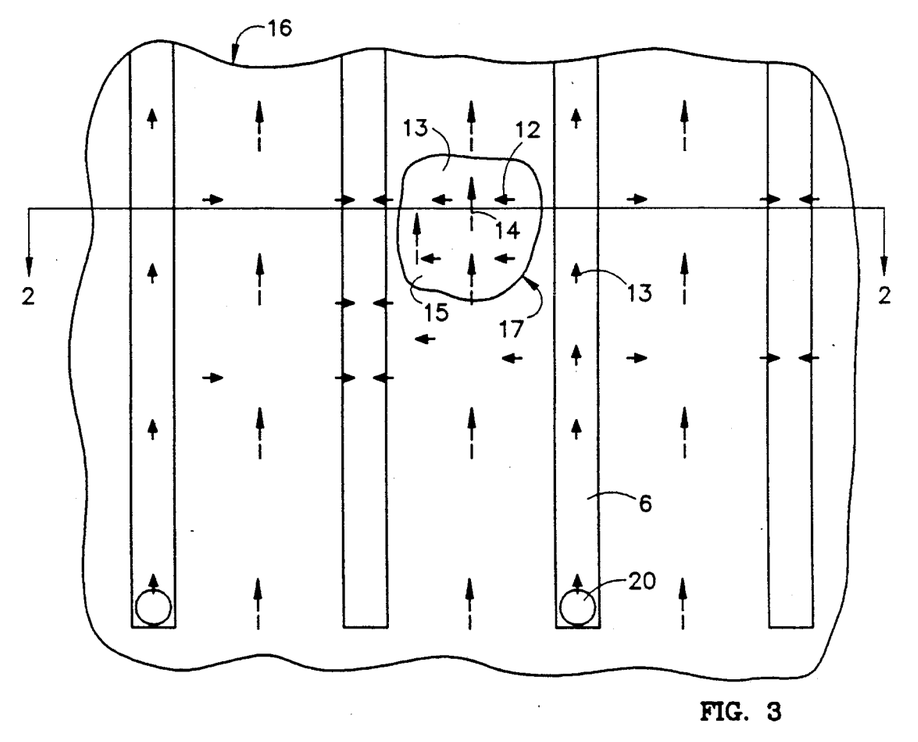
FIG. 3 is a transparent partial view of a cross-laminated product which has been molded by the first and second mold cavities shown in FIG. 1 and FIG. 2.

The first preferred embodiment is illustrated in FIGS. 1-3.

Shown is a mold system comprising a first mold cavity 1 with a first-layer-defining-mold-cavity-section 2 and a second mold cavity 3 with a second-layer-defining-mold-cavity-section 4 with a second-cavity-section-wall 5.

The first mold cavity 1 comprises a first-cavity-flow-channel 6 which is located adjacent the first-layer-defining-mold-cavity-section 2, the second-layer-defining-mold-cavity-section 4 with thickness C is as least as thick as the first-cavity-flow-channel 6 with thickness F, whereby it is possible to mold the product without a ribbed surface.

The mold system includes a first mold 7 having a first mold part 8 which includes a gate, and a complementary mold part 9. The mold system further includes a second mold 10 having a second mold part 11 which also includes a gate and the same complementary mold part 9.

The system is operated by injecting a quantity of first plastic into the first mold cavity 1 so that first plastic flows in the first-layer-defining-mold-cavity-section 2 in a first predetermined general direction, as indicated by a first arrow 12.

The flowed first plastic is then at least partly solidified in the first-layer-defining-mold-cavity-section 2 to thereby form a first plastic layer 13 having a first-direction-flow-record, similarly indicated by arrow 12.

The mold system is then adjusted to thereby provide the second mold cavity 3 with the second-cavity-section-wall 5 including the first plastic layer 13.

A quantity of second plastic is then adjusted into the second mold cavity 3 so that second plastic flows in the second-layer-defining-mold-cavity-section 4 in a second predetermined general direction, indicated by a second arrow 14, whereby second plastic in the second-layer-defining-mold-cavity-section fuses with the first plastic layer 13.

The flowed second plastic is then adjusted in the second-layer-defining-mold-cavity-section 4, to thereby form a second plastic layer 15, so that the second plastic layer 15 has a second-direction-flow-record, similarly indicated by the second arrow 14, which is approximately at right angle to the first-direction-flow-record and therefore is positively different from the first-direction-flow-record, indicated by the first arrow 12, to thereby form a plastic product 16 with a cross-laminated section 17 that includes both the first plastic layer 13 and the second plastic layer 15. Arrows showing the flow direction of the second plastic are dotted.

The mold system is then adjusted to thereby eject the plastic product 16. The plastic product 16 has gate marks 20 formed by gate means, not shown, of the first gate part 8, for injecting the first plastic.

When injecting the quantity of first plastic into the first mold cavity 1 so that first plastic flows in the first-layer-defining-mold-cavity-section 2 in a first predetermined general direction, as indicated by the first arrow 12, the first plastic is directed into the first-layer-defining-mold-cavity-section 2 via the first-cavity-flow-channel 6, so that the first plastic flows in the first-cavity-flow-channel 6 in a direction, which is indicated by a third arrow 13, which is positively different from the first predetermined general direction, which was indicated by the first arrow 12. The angle between the flow directions depend mostly on relative cavity thicknesses within the first mold cavity.

The second plastic layer 15 is molded with a wall thickness which is much thicker than the first plastic layer 13.

When, the mold system is adjusted to thereby provide the second mold cavity 3 with the second-cavity-section-wall 5 including the first plastic layer 13, the mold system is adjusted by separating the first gate part 8 from the complementary part 9 and combining the second gate part 11 with the complementary part 9 while retaining the first plastic layer 13 with the complementary part 9, thereby transferring the first plastic layer 13 from the first mold 7 to the second mold 10 in order to compose the second mold cavity 3 subsequent to the second-cavity-section-wall 5 including the first plastic layer 13.

When the mold system is adjusted to thereby provide the second mold cavity 3 with the second-cavity-section-wall 5 including the first plastic layer 13, a substance 19 is added to the surface of the first plastic layer 13, before the first plastic 13 layer fuses with the second plastic layer 15, in order to seal the substance between the first plastic layer 13 and the second plastic layer 15. The substance may for example be deposited as a result of a printing process, a fluorination process or an aluminizing process or for other reasons.

The first plastic of this first embodiment is a polystyrene plastic resin in a red colour and the second plastic is a clear transparent polystyrene.

It is also possible to mold the first plastic layer 13 and the second plastic layer 15 in the reverse order. Then the second plastic layer 15 is molded with a wall thickness which is much thinner than the first plastic layer 13, and the second plastic layer 15 is still molded with a second-direction-flow-record which is approximately at a right angle to the first-direction-flow-record. Since the flow of molten plastic in a mold is slightly improved when one of the mold walls is made of an other plastic material with a heat conductivity which is much lower than that of steel, the flow directions of the injected plastic may vary slightly when the order of injection is reversed.

It is usually an advantage to inject the thinnest layer last, since the thinnest layer require the highest injection pressure, this pressure may be reduced when injecting into a mold where one side wall of a cavity is made up of another plastic material.

Figure 4:
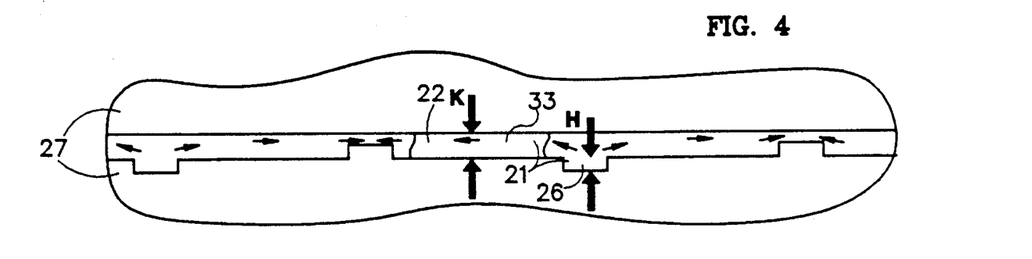
FIG. 4 is a partial sectional view of a first mold cavity encasing a first plastic layer of a second preferred embodiment in accordance with the invention.
Figure 5:
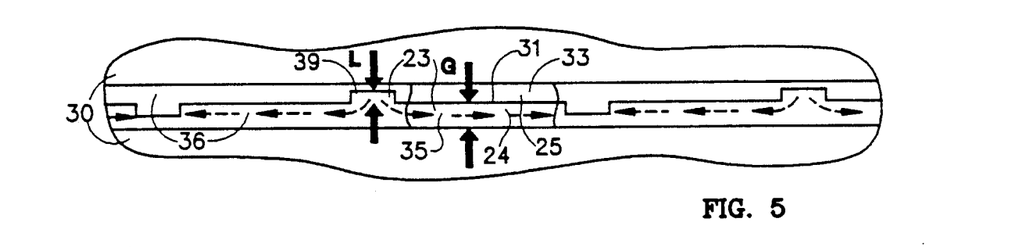
FIG. 5 is a partial sectional view of a second mold cavity encasing a second plastic layer of the second preferred embodiment in accordance with the invention. Also shown is a sectional view of a cross-laminated product section taken along line 5—5 in FIG. 6.
Figure 6:
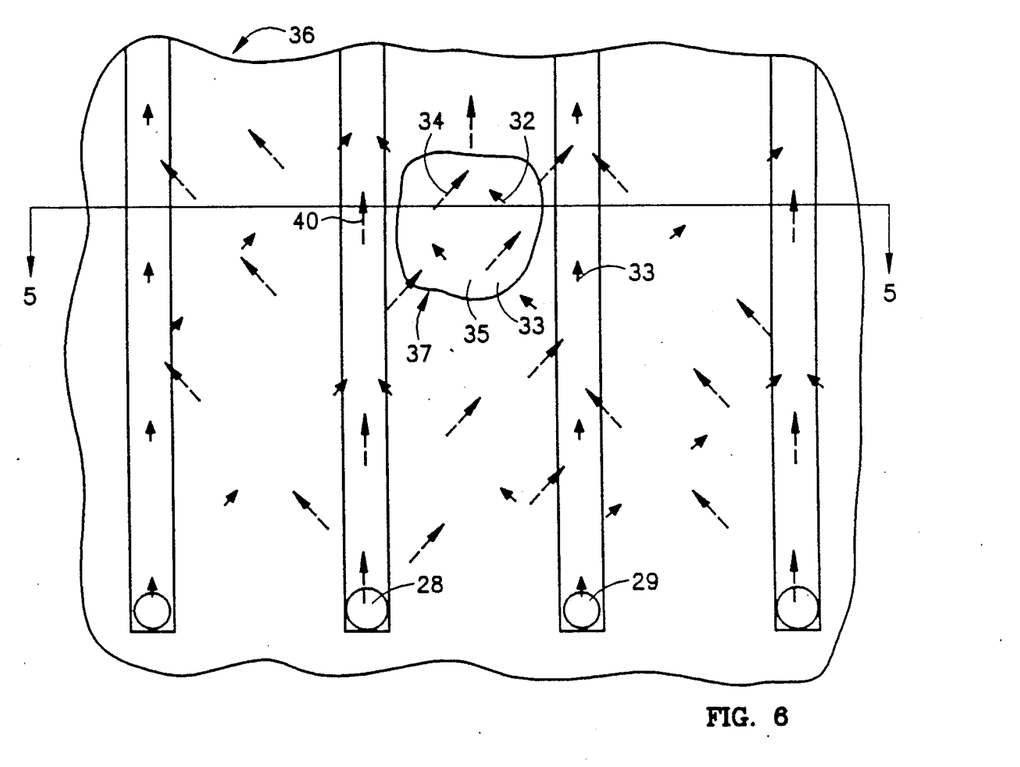
FIG. 6 is a transparent partial view of a cross-laminated product which has been molded by the first and second mold cavities shown in FIG. 5 and FIG. 6.

The second preferred embodiment is illustrated in FIGS. 4-6.

Shown is a mold system comprising a first mold cavity 21 with a first-layer-defining-mold-cavity-section 22 and a second mold cavity 23 with a second-layer-defining-mold-cavity-section 24 with a second-cavity-section-wall 25.

The first mold cavity 21 comprises a first-cavity-flow-channel 26 which is located adjacent the first-layer-defining-mold-cavity-section 22, the second-layer-defining-mold-cavity-section 24 with thickness G is as least as thick as the first-cavity-flow-channel 26 with thickness H, whereby it is possible to mold the plastic product 36 without a ribbed surface. The second mold cavity 23 comprises a second-cavity-flow-channel 39 which is located adjacent the second-layer-defining-mold-cavity-section 24, the first-layer-defining-mold-cavity-section 22 with thickness K is at least as thick as the second-cavity-flow-channel 39 with thickness L, whereby it is possible to mold the plastic product 36 without a ribbed surface.

The mold system includes a first mold 27 with a first mold cavity 21, and a separate second mold 30 with a second mold cavity 23, each mold has its own gate means, not shown.

The system is operated by injecting a quantity of first plastic into the first mold cavity 21 so that first plastic flows in the first-layer-defining-mold-cavity-section 22 in a first predetermined general direction, as indicated by a first arrow 32.

The flowed first plastic is then at least partly solidified in the first-layer-defining-mold-cavity-section 22 to thereby form a first plastic layer 33 having a first-direction-flow-record, similarly indicated by arrow 32.

The mold system is then adjusted to thereby provide the second mold cavity 23 with the second-cavity-section-wall 25 including the first plastic layer 33.

A quantity of second plastic is then injected into the second mold cavity 23 so that second plastic flows in the second-layer-defining-mold-cavity-section 24 in a second predetermined general direction, indicated by a second arrow 34, whereby second plastic in the second-layer-defining-mold-cavity-section fuses with the first plastic layer 33.

The flowed second plastic is then solidified in the second-layer-defining-mold-cavity-section 24, to thereby form a second plastic layer 35, so that the second plastic layer 35 has a second-direction-flow-record, similarly indicated by the second arrow 34, which is approximately at a right angle to the first-direction-flow-record, and therefore is positively different from the first-direction-flow-record, indicated by the first arrow 32, to thereby form a plastic product 36 with a cross-laminated section 37 that includes both the first plastic layer 33 and the second plastic layer 35. Arrows showing the flow direction of the second plastic are dotted.

The mold system is then adjusted to thereby eject the plastic product 36. The plastic product 36 has ate marks 29 formed by gate means, not shown, of the first mold cavity 21, for injecting the first plastic and other gate marks 28 formed by gate means, not shown, of the second mold cavity 23, for injecting the second plastic.

When injecting the quantity of first plastic into the first mold cavity 21 so that first plastic flows in the first-layer-defining-mold-cavity-section 22 in a first predetermined general direction, as indicated by the first arrow 32, the first plastic is directed into the first-layer-defining-mold-cavity-section 22 via the first-cavity-flow-channel 26, so that the first plastic flows in the first-cavity-flow-channel 26 in a direction, which is indicated by a third arrow 33, which is positively different from the first predetermined general direction, which was indicated by the first arrow 32. The angle between the flow directions depend mostly on relative cavity thicknesses within the first mold cavity.

When injecting the quantity of second plastic into the second mold cavity 23 so that second plastic flows in the second-layer-defining-mold-cavity-section 24 in a second predetermined general direction, as indicated by a second arrow 34, the second plastic is directed into the second-layer-defining-mold-cavity-section 24 via the second-cavity-flow-channel 39, so that the second plastic flows in the second-cavity-flow-channel 39 in a direction, which is indicated by a fourth arrow 40, which is positively different from the second predetermined general direction, which was indicated by the second arrow 34. The angle between the flow directions depend mostly on relative cavity thicknesses within the second mold cavity. The first plastic layer 33 is molded with a wall thickness which is approximately the same as the wall thickness of the second plastic layer 35.

When the mold system is adjusted thereby providing the second mold cavity 23 with the second-cavity-section-wall 25 including the first plastic layer 33, the mold system is adjusted by transferring the first plastic layer 33 from the first mold 27 to the second mold 30, for example with the help of a robot, in order to compose the second mold cavity 23 subsequent to the second-cavity-section-wall 25 including the first plastic layer 33.

When the mold system is adjusted thereby providing the second mold cavity 23 with the second-cavity-section-wall 25 including the first plastic layer 33, a substance 31 is added to the surface of the first plastic layer 33, before the first plastic 33 layer fuses with the second plastic layer 35, in order to seal the substance between the first plastic layer 33 and the second plastic layer 35. The substance may for example be deposited as a result of a printing process, a fluorination process or an aluminizing process or for other reasons.

The first plastic is an ABS plastic resin and the second plastic is a PVC plastic resin.

Figure 7:
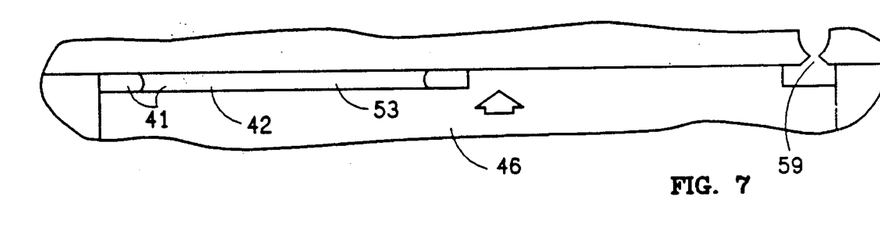
FIG. 7 is a partial sectional view of a first mold cavity encasing a first plastic layer of a third preferred embodiment in accordance with the invention.
Figure 8:
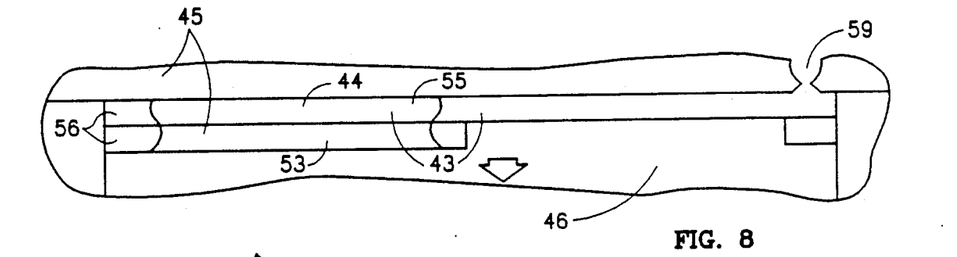
FIG. 8 is a partial sectional view of a second mold cavity encasing a second plastic layer of the third preferred embodiment in accordance with the invention. Also shown is a sectional view of a cross-laminated product section taken along line 8—8 in FIG. 9.
Figure 9:
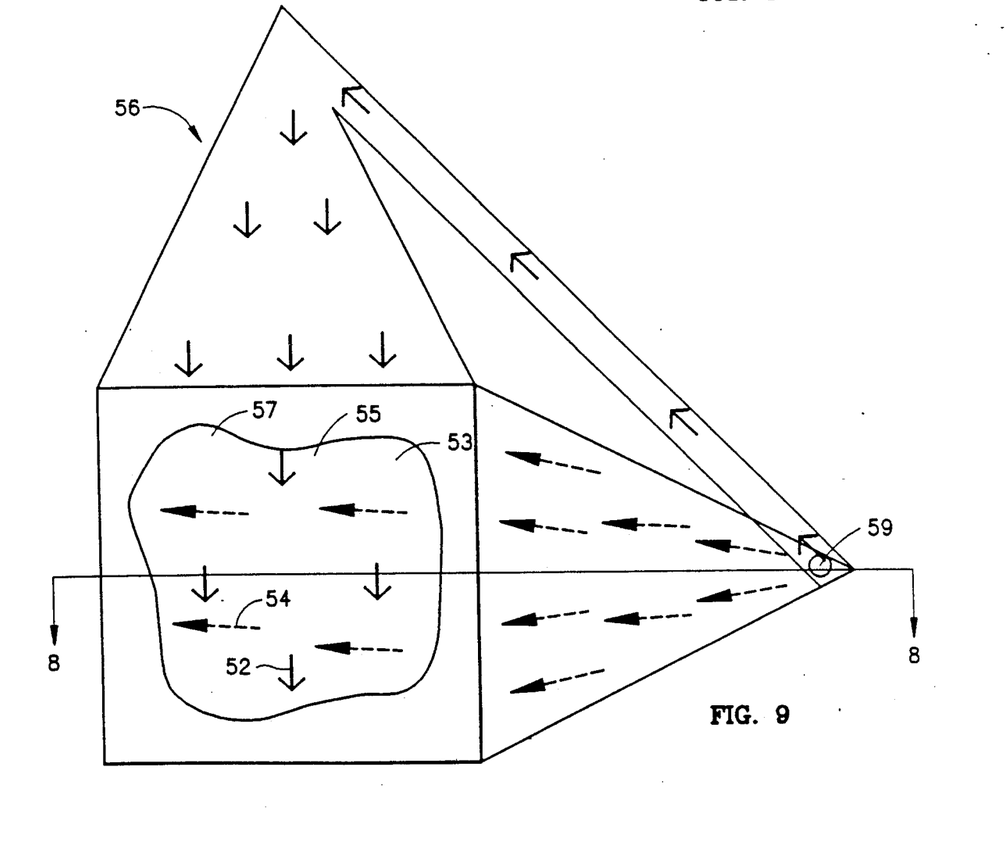
FIG. 9 is a transparent view of a cross-laminated product which has been molded by the first and second mold cavities shown in FIG. 7 and FIG. 8.

The third preferred embodiment is illustrated in FIGS. 7-9.

Shown is a mold system comprising a first mold cavity 41 with a first-layer-defining-mold-cavity-section 42 and a second mold cavity 43 with a second-layer-defining-mold-cavity-section 44 with a second-cavity-section-wall 45.

The system is operated by injecting a quantity of first plastic into the first mold cavity 41 so that first plastic flows in the first-layer-defining-mold-cavity-section 42 in a first predetermined general direction, as indicated by a first arrow 52.

The flowed first plastic is then at least partly solidified in the first-layer-defining-mold-cavity-section 42 to thereby form a first plastic layer 53 having a first-direction-flow-record, similarly indicated by arrow 52.

The mold system is then adjusted to thereby provide the second mold cavity 43 with the second-cavity-section-wall 45 including the first plastic layer 53.

A quantity of second plastic is then injected into the second mold cavity 43 so that second plastic flows in the second-layer-defining-mold-cavity-section 44 in a second predetermined general direction, indicated by a second arrow 54, whereby second plastic in the second-layer-defining-mold-cavity-section fuses with the first plastic layer 53. The flowed second plastic is then solidified in the second-layer-defining-mold-cavity-section 44, to thereby form a second plastic layer 55, so that the second plastic layer 55 has a second-direction-flow-record, similarly indicated by the second arrow 54, which is approximately at a right angle to the first-direction-flow-record, and therefore is positively different from the first-direction-flow-record, indicated by the first arrow 52, to thereby form a plastic product 56 with a cross-laminated section 57 that includes both the first plastic layer 53 and the second plastic layer 55. Arrows showing the flow direction of the second plastic are dotted.

The mold system is then adjusted to thereby eject the plastic product 56.

The first plastic layer 53 is molded with a wall thickness which is approximately the same as the wall thickness of the second plastic layer 55.

The first mold cavity 41 comprises a retractable wall section 46 and becomes the second mold cavity 43 subsequent to the retractable wall section being retracted and the second-cavity-section-wall 45 becoming inclusive of the first plastic layer 53.

When the mold system is adjusted thereby providing the second mold cavity 43 with the second-cavity-section-wall 45 including the first plastic layer 53, the mold system is adjusted by retracting the retractable wall section 46, so that the second mold cavity 43 retains the first plastic layer 53.

The first plastic and the second plastic is injected through a shared gate 59.

The first plastic is a clear transparent polystyrene plastic resin and the second plastic is also a clear transparent polystyrene plastic resin.

While the above description contains many specificities, these should not be construed as limitations on the scope of the invention, but rather as exemplification of the preferred embodiments thereof. Many other variations are possible. All embodiments have for simplification been shown applied to flat plastic products, but the invention is equally applicable to products which have non flat surfaces, particularly hollow cup shaped products.

The shown embodiments also all have a non ribbed surface, but in many cases a ribbed surface is advantageous, and the invention applies equally well to products with ribbed surfaces.

The various particulars shown in a specific preferred embodiment also applies to the other preferred embodiments, it is for example quite possible to cover the surface of the first plastic layer of the third preferred embodiment with a substance as is shown in the first and second preferred embodiments.

When the first and second plastic material is the same material it is not necessary to use an injection molding machine with more than one injection unit.

I claim:

1. A method of injection molding a plastic product, with a cross-laminated section that includes a first plastic layer and a second plastic layer, in a mold system comprising a first mold cavity with a first-layer-defining-mold-cavity-section and a second mold cavity with a second-layer-defining-mold-cavity-section with a second-cavity-section-wall, the method comprising the steps of:

(a) injecting a quantity of first plastic into the first mold cavity so that the first plastic follows in the first-layer-defining-mold-cavity-section in a first predetermined general direction, (b) solidifying at least partly the flowed first plastic in the first-layer-defining-mold-cavity-section to thereby form said first plastic layer having a first-direction-flow-record, (c) adjusting the mold system to thereby provide the second mold cavity with the second-cavity-section-wall including said first plastic layer, (d) injecting a quantity of second plastic into the second mold cavity so that the second plastic flows in the second-layer-defining-mold-cavity-section in a second predetermined general direction, whereby the second plastic in the second-layer-defining-mold-cavity-section fuses with said first plastic layer, (e) solidifying the flowed second plastic in the second-layer-defining-mold-cavity-section to thereby form said second plastic layer, so that the second plastic layer has a second-direction-flow-record which is positively different from said first-direction-flow-record, to thereby form said plastic product with said cross-laminated section that includes both the first plastic layer and the second plastic layer, and (f) adjusting the mold system to thereby eject the product, wherein the first mold cavity comprises a first-cavity-flow-channel which is located adjacent the first-layer-defining-mold-cavity-section, with a flow channel being defined as a portion of a mold cavity which is significantly thicker and wider than the adjacent mold cavity thickness for the purpose of directing the flow of injected plastic, and wherein step (a) comprises the step of:

(g) directing the first plastic into the first-layer-defining-mold-cavity-section via the first-cavity-flow-channel, so that the first plastic flows in the first-cavity-flow-channel in a direction which is positively different from said first predetermined general direction.

2. A method according to claim 1, wherein the second mold cavity comprises a second-cavity-flow-channel which is located adjacent said second-layer-defining-mold-cavity-section, and wherein step (d) comprises the step of:

(h) directing second plastic into the second-layer-defining-mold-cavity-section via the second-cavity-flow-channel, so that the second plastic flows in the second-cavity-flow-channel in a direction which is positively different from said second predetermined general direction.

3. A method according to claim 2, wherein the second-layer-defining-mold-cavity-section is at least as thick as said first-cavity-flow-channel, and wherein the first-layer-defining-mold-cavity-section is at least as thick as said second-cavity-flow-channel.

4. A method according to claim 1, wherein the cross-laminated section of the plastic product includes a primary plastic layer, and the mold system includes a primary mold cavity with a primary-layer-defining-mold-cavity-section, and the first-layer-defining-mold-cavity-section has a first-cavity-section-wall, and prior to beginning step (a) the method comprises the steps of:
  (h) injecting a quantity of primary plastic into the primary mold cavity so that the primary plastic flows in the primary-layer-defining-mold-cavity-section in a primary predetermined general direction,
  (i) solidifying at least partly the flowed primary plastic in the primary-layer-defining-mold-cavity-section to thereby form said primary plastic layer having a primary-direction-flow-record,
  (j) adjusting the mold system to thereby provide the first mold cavity with the first-cavity-section-wall including said first plastic layer,
wherein step (a) comprises the step of:
  (k) fusing the first plastic in the first-layer-defining-mold cavity-section with said primary plastic layer,
wherein step (b) comprises the step of:
  (l) solidifying at least partly the flowed first plastic in the first-layer-defining-mold-cavity-section, so that the first plastic layer has a first-direction-flow-record which is positively different from said primary-direction-flow-record.

5. A method according to claim 1, wherein said second plastic layer is molded with a second-direction-flow-record which is approximately at a right angle to said first-direction-flow-record.

6. A method according to claim 5, wherein said second plastic layer is molded with a wall thickness which is approximately the same as the wall thickness of the first plastic layer.

7. A method according to claim 5, wherein said second plastic layer is molded with a wall thickness which is much thicker than said first plastic layer.

8. A method according to claim 1, wherein said second plastic layer is molded with a wall thickness which is approximately the same as the wall thickness of the first plastic layer.

9. A method according to claim 1, wherein said second plastic layer is molded with a wall thickness which is much thicker than said first plastic layer.

10. A method according to claim 9, wherein said second plastic layer is molded with a second-direction-flow-record which is approximately at a right angle to said first-direction-flow-record.

11. A method according to claim 1, wherein the first plastic and the second plastic are injected through at least one shared gate means.

12. A method according to claim 1, wherein the first plastic and the second plastic are injected through separate gate means.

13. A method according to claim 1, wherein the first mold cavity comprises a retractable wall section and becomes the second mold cavity subsequent to the retractable wall section being retracted and subsequent to the second-cavity-section-wall becoming inclusive of said first plastic layer, wherein step (c) comprises the step of:
  (h) adjusting the mold system by retracting the retractable wall section, so that the second mold cavity retains said first plastic layer.

14. A method according to claim 1, wherein the mold system includes a first mold with a first gate part and a complementary part and the mold system further includes a second mold with a second gate part and the same complementary part, wherein step (c) comprises the step of:
  (h) adjusting the mold system by separating the first gate part from the complementary part and combining the second gate part with the complementary part while retaining the first plastic layer with the complementary part, thereby transferring the first plastic layer from the first mold to the second mold in order to compose said second mold cavity subsequent to the second-cavity-section-wall including said first plastic layer.

15. A method according to claim 1, wherein the mold system includes a first mold with a first mold cavity and a separate second mold with a second mold cavity, wherein step (c) comprises the step of:
  (h) transferring the first plastic layer from the first mold to the second mold in order to compose said second mold cavity subsequent to the second-cavity-section-wall including said first plastic layer 16. A method according to claim 1, wherein step (c) includes the step of:
  (h) adding a substance to the surface of the first plastic layer, before step (d) wherein the first plastic layer fuses with the second plastic layer, in order to seal the substance between the first plastic layer and the second plastic layer.

17. A method according to claim 1, wherein the first plastic is the same material and the same color or transparency as the second plastic.

18. A method according to claim 1, wherein the first plastic is the same material as the second plastic but the first plastic has a different color or transparency than the second material.

19. A method according to claim 1, wherein the first plastic is a material which has a different chemical composition than the second plastic.

20. A method according to claim 1, wherein the second-layer-defining-mold-cavity-section is at least as thick as said first-cavity-flow-channel.

21. A method of injection molding a plastic product, with a cross-laminated section that includes a first plastic layer and a second plastic layer, in a mold system comprising a first mold cavity with a first-layer-defining-mold-cavity-section and a second mold cavity with a second-layer-defining-mold-cavity-section with a second-cavity-section-wall, the method comprising the steps of:
  (a) injecting a quantity of first plastic into the first mold cavity so that the first plastic flows in the first-layer-defining-mold-cavity-section in a first predetermined general direction,
  (b) solidifying at least partly the flowed first plastic in the first-layer-defining-mold-cavity-section to thereby form said first plastic layer having a first-direction-flow-record, (c) adjusting the mold system to thereby provide the second mold cavity with the second-cavity-section-wall including said first plastic layer, (d) injecting a quantity of second plastic into the second mold cavity so that the second plastic flows in the second-layer-defining-mold-cavity-section in a second predetermined general direction, whereby the second plastic in the second-layer-defining-mold-cavity-section fuses with said first plastic layer (e) solidifying the flowed second plastic in the second-layer-defining-mold-cavity-section to thereby form said second plastic layer, so that the second plastic layer has a seconddirection-flow-record which is positively different from said first-direction-flow-record, to thereby form said plastic product with said cross-laminated section that includes both the first plastic layer and the second plastic layer, and (f) adjusting the mold system to thereby eject the product, wherein the second mold cavity comprises a second-cavity-flow-channel which is located adjacent said second-layer-defining-mold-cavity-section, with a flow channel being defined as a portion of a mold cavity which is significantly thicker and wider than the adjacent mold cavity thickness for the purpose of directing the flow of injected plastic, and wherein step (d) comprises the step of:

(g) directing second plastic into the second-layer-defining-mold-cavity-section via the second-cavity-flow-channel, so that the second plastic flows in the second-cavity-flow-channel in a direction which is positively different from said second predetermined general direction.

22. A method according to claim 21, wherein the cross-laminated section of the plastic product includes a primary plastic layer, and the mold system includes a primary mold cavity with a primary-layer-defining-mold-cavity-section, and the first-layer-defining-mold-cavity-section has a first-cavity-section-wall, and prior to beginning step (a) the method comprises the steps of:

(h) injecting a quantity of primary plastic into the primary mold cavity so that the primary plastic flows in the primary-layer-defining-mold-cavity-section in a primary predetermined general direction, (i) solidifying at least partly the flowed primary plastic in the primary-layer-defining-mold-cavity-section to thereby form said primary plastic layer having a primary-direction-flow-record, (j) adjusting the mold system to thereby provide the first mold cavity with the first-cavity-section-wall including said first plastic layer, wherein step (a) comprises the step of:

(k) fusing the first plastic in the first-layer-defining-mold-cavity-section with said primary plastic layer, wherein step (b) comprises the step of:

(l) solidifying at least partly the flowed first plastic in the first-layer-defining-mold-cavity-section, so that the first plastic layer has a first-direction-flow-record which is positively different from said primary-direction-flow-record.

23. A method according to claim 21, wherein said second plastic layer is molded with a second-direction-flow-record which is approximately at a right angle to said first-direction-flow-record.

24. A method according to claim 23, wherein said second plastic layer is molded with a wall thickness which is approximately the same as the wall thickness of the first plastic layer.

25. A method according to claim 23, wherein said second plastic layer is molded with a wall thickness which is much thicker than said first plastic layer.

26. A method according to claim 21, wherein said second plastic layer is molded with a wall thickness which is approximately the same as the wall thickness of the first plastic layer.

27. A method according to claim 21, wherein said second plastic layer is molded with a wall thickness which is much thicker than said first plastic layer.

28. A method according to claim 27, wherein said second plastic layer is molded with a second-direction-flow-record which is approximately at a right angle to said first-direction-flow-record.

29. A method according to claim 21, wherein the first plastic and the second plastic are injected through at least one shared gate.

30. A method according to claim 21, wherein the first plastic and the second plastic are injected through separate gate means.

31. A method according to claim 21, wherein the first mold cavity comprises a retractable wall section and becomes the second mold cavity subsequent to the retractable wall section being retracted and subsequent to the second-cavity-section-wall becoming inclusive of said first plastic layer, wherein step (c) comprises the step of:

(h) adjusting the mold system by retracting the retractable wall section, to the second mold cavity retains said first plastic layer.

32. A method according to claim 21, wherein the mold system includes a first mold with a first gate part and a complementary part and the mold system further includes a second mold with a second gate part and the same complementary part, wherein step (c) comprises the step of:

(h) adjusting the mold system by separating the first gate part from the complementary part and combining the second gate part with the complementary part while retaining the first plastic layer with the complementary part, thereby transferring the first plastic layer from the first mold to the second mold in order to compose said second mold cavity subsequent to the second-cavity-section-wall including said first plastic layer.

33. A method according to claim 21, wherein the mold system includes a first mold with a first mold cavity and a separate second mold with a second mold cavity, wherein step (c) comprises the step of:

(h) transferring the first plastic layer form the first mold to the second mold in order to compose said second mold cavity subsequent to the second-cavity-section-wall including said first plastic layer.

34. A method according to claim 21, wherein step (c) includes the step of:

(h) adding a substance to the surface of the first plastic layer, before step (d) wherein the first plastic layer fuses with the second plastic layer, in order to seal the substance between the first plastic layer and the second plastic layer.

35. A method according to claim 21, wherein the first plastic is the same material and the same color or transparency as the second plastic.

36. A method according to claim 21, wherein the first plastic is the same material as the second plastic but the first plastic has a different color or transparency than the second material.

37. A method according to claim 21, wherein the first plastic is a material which has a different chemical composition than the second plastic.

38. A method according to claim 21, wherein the first-layer-defining-mold-cavity-section is at least as thick as said second-cavity-flow-channel.

* * * * *

UNITED STATES PATENT AND TRADEMARK OFFICE
CERTIFICATE OF CORRECTION

PATENT NO. : 5,045,268  
DATED : September 3, 1991  
INVENTOR(S) : Jens O. Sorensen It is certified that error appears in the above-indentified patent and that said Letters Patent is hereby corrected as shown below:

Title page : In the Abstract, Penultimate line, change "The" to --In another embodiment, the--.

Column 3, line 50, change "as" (first occurrence) to --at--.

Column 3, line 51, change "with" to --minus the first-layer-defining mold cavity section 2 with resulting--.

Column 4, line 4, change "adjusted" to --injected--.

Column 4, line 11, change "adjusted" to --solidified--.

Column 5, line 29, change "as" to --at--.

Column 5, line 30, change "with" to --minus the first-layer-defining mold cavity section 22 with resulting--.

Column 5, line 35, after "24", change the comma to a period; and change "the" to --The--.

Column 5, line 37, change "with" to --minus the second-layer-defining mold cavity section 24 with resulting--.

Column 6, line 9, change "ate" to --gate--.

Column 8, line 20, change "follows" to --flows--.

Column 9, line 7, after "channel", delete the comma and insert -- minus the first-layer-defining mold cavity section,--.

Column 9, line 9, after "channel", delete the period and insert -- minus the second-layer-defining mold cavity section.--.

Column 10, line 51, after "channel", delete the period and insert -- minus the first-layer-defining mold cavity section.--.

Column 12, line 33, change "to" to --so that--.

UNITED STATES PATENT AND TRADEMARK OFFICE
CERTIFICATE OF CORRECTION

PATENT NO. : 5,045,268
DATED : September 3, 1991
INVENTOR(S) : Jens O. Sorensen

It is certified that error appears in the above-indentified patent and that said Letters Patent is hereby corrected as shown below:

Column 12, line 55, change "form" to --from--.

Column 14, line 5, after "channel", delete the period and insert -- minus the second-layer-defining mold cavity section.--.

Signed and Sealed this

Thirteenth Day of June, 1995

*Attest:*

BRUCE LEHMAN

*Attesting Officer*     *Commissioner of Patents and Trademarks*